US009235396B2

(12) United States Patent
Ke et al.

(10) Patent No.: US 9,235,396 B2
(45) Date of Patent: Jan. 12, 2016

(54) OPTIMIZING DATA PARTITIONING FOR DATA-PARALLEL COMPUTING

(75) Inventors: Qifa Ke, Cupertino, CA (US); Vijayan Prabhakaran, Sunnyvale, CA (US); Yinglian Xie, Cupertino, CA (US); Yuan Yu, Cupertino, CA (US); Jingyue Wu, New York, NY (US); Junfeng Yang, New York, NY (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 446 days.

(21) Appl. No.: 13/325,049

(22) Filed: Dec. 13, 2011

(65) Prior Publication Data

US 2013/0152057 A1    Jun. 13, 2013

(51) Int. Cl.
*G06F 9/44* (2006.01)
*G06F 9/45* (2006.01)

(52) U.S. Cl.
CPC ...................................... *G06F 8/453* (2013.01)

(58) Field of Classification Search
USPC .......................................................... 717/132
See application file for complete search history.

(56) References Cited

U.S. PATENT DOCUMENTS

| | | | |
|---|---|---|---|
| 7,660,884 B2* | 2/2010 | Pu ................................. | 709/223 |
| 7,685,083 B2* | 3/2010 | Fairweather .................... | 706/45 |
| 7,734,615 B2 | 6/2010 | Anderson et al. | |
| 2004/0024720 A1* | 2/2004 | Fairweather .................... | 706/46 |
| 2006/0218123 A1* | 9/2006 | Chowdhuri et al. ............... | 707/2 |
| 2007/0112714 A1* | 5/2007 | Fairweather .................... | 706/46 |
| 2009/0254916 A1* | 10/2009 | Bose et al. ..................... | 718/104 |
| 2010/0241827 A1* | 9/2010 | Yu et al. ........................ | 712/30 |
| 2010/0241828 A1* | 9/2010 | Yu et al. ........................ | 712/30 |
| 2013/0152057 A1* | 6/2013 | Ke et al. ........................ | 717/132 |

OTHER PUBLICATIONS

Ke et al., "Optimizing Data Partitioning for Data-Parallel Computing", 2011, retrieved from <https://www.usenix.org/legacy/event/hotos/tech/final_files/Ke.pdf> total pp. 5.*
Yu, et al., "Distributed Aggregation for Data-Parallel Computing: Interfaces and Implementations", Retrieved at <<http://research.microsoft.com/pubs/102138/sosp-035-yu.pdf>>, Proceedings of the ACM SIGOPS 22nd symposium on Operating systems principles, Oct. 11-14, 2009, pp. 247-260.
Isard, et al., "Distributed Data-Parallel Computing Using a High-Level Programming Language", Retrieved at <<http://research.microsoft.com/pubs/102137/sigmod09.pdf>>, Proceedings of the 35th SIGMOD international conference on Management of data, Jun. 29-Jul. 2, 2009, pp. 987-994.

(Continued)

*Primary Examiner* — Don Wong
*Assistant Examiner* — Marina Lee
(74) *Attorney, Agent, or Firm* — Sandy Swain; Steve Wight; Micky Minhas

(57) ABSTRACT

A data partitioning plan is automatically generated that—given a data-parallel program and a large input dataset, and without having to first run the program on the input dataset—substantially optimizes performance of the distributed execution system that explicitly measures and infers various properties of both data and computation to perform cost estimation and optimization. Estimation may comprise inferring the cost of a candidate data partitioning plan, and optimization may comprise generating an optimal partitioning plan based on the estimated costs of computation and input/output.

20 Claims, 5 Drawing Sheets

(56) References Cited

OTHER PUBLICATIONS

Hameurlain, et al., "A Cost Evaluator for Parallel Database Systems", Retrieved at <<http://www.google.co.in/url?g=http://citeseerx.ist.psu.edu/viewdoc/download%3Fdoi%3D10.1.1.56.4763%26rep%3Drep1%26type%3Dpdf&sa=U&ei=LHRCTpvaKYjzrQedrs2iBw&ved=0CBsQFjAH&usg=AFQjCNFpv7UQ8-0xlhaTWnnxUFEeloaxXA>>, Proceedings of the 6th International Conference on Database and Expert Systems Applications, Sep. 4-8, 1995, pp. 146-156.

Diaconescu, et al., "A Data Parallel Programming Model Based on Distributed Objects", Retrieved at <<http://ieeexplore.ieee.org/stamp/stamp.jsp?tp=&arnumber=1137782>>, Proceedings of the IEEE International Conference on Cluster Computing, 2002, pp. 455-460.

Hu, et al., "Optimizing Data Decomposition for Data Parallel Programs", Retrieved at <<http://ieeexplore.ieee.org/stamp/stamp.jsp?arnumber=04115785>>, Proceedings of the International Conference on Parallel Processing (ICPP), vol. 2, Aug. 15, 1994, pp. 225-232.

Baumstark, et al., "Extracting an Explicitly Data-Parallel Representation of Image-Processing Programs", <<http://www.ece.gatech.edu/research/labs/pica/pdf/ieee-wcre03-DP-rep.pdf>>, Proceedings of the 10th Working Conference on Reverse Engineering (WCRE), Nov. 13-16, 2003, pp. 11.

"Linear Programming", Retrieved at <<http://en.wikipedia.org/wiki/Linear_programming>>, Retrieved Date: Aug. 10, 2011, pp. 1-20.

"The Hadoop Project", Retrieved at <<http://hadoop.apache.org/>>, Retrieved Date: Aug. 10, 2011, pp. 1-3.

"The HIVE Project", Retrieved at <<http://hive.apache.org/>>, Retrieved Date: Aug. 10, 2011, p. 1.

"Vertica", Retrieved at <<http://www.vertica.com/>>, Retrieved Date: Aug. 10, 2011, p. 1.

Beyer, et al., "On Synopses for Distinct-value Estimation Under Multiset Operations", Retrieved at <<https://www.mpi-sb.mpg.de/~rgemulla/publications/beyer07distinct.pdf>>, Proceedings of the ACM SIGMOD international conference on Management of data, Jun. 12-14, 2007, pp. 199-210.

Boyd, et al., "Convex Optimization", Retrieved at <<http://www.stanford.edu/~boyd/cvxbook/bv_cvxbook.pdf>>, Cambridge University Press, 2004, pp. 730.

Chaudhuri, et al., "Random Sampling for Histogram Construction: How Much is Enough?", Retrieved at <<http://www.mathcs.emory.edu/~cheung/Courses/584-StreamDB/Syllabus/papers/Histogram/1998-Chaudhuri-Histo.pdf>>, Proceedings of the 1998 ACM SIGMOD international conference on Management of data, vol. 27, No. 2, Jun. 1998, pp. 12.

Cormode, et al., "Finding Frequent Items in Data Streams", Retrieved at <<http://www.vldb.org/pvldb/1/1454225.pdf>>, Proceedings of the VLDB Endowment, vol. 1, No. 2, Aug. 2008, pp. 1530-1541.

Dean, et al., "MapReduce: Simplified Data Processing on Large Clusters", Retrieved at <<http://static.googleusercontent.com/external_content/untrusted_dlcp/labs.google.com/enfipapers/mapreduce-osdi04.pdf>>, In OSDI, 2004, pp. 1-13.

Dewitt, et al., "Practical Skew Handling in Parallel Joins", Retrieved at <<http://citeseerx.ist.psu.edu/viewdoc/download?doi=10.1.1.104.3075&rep=rep1&type=pdf>>, Proceedings of the 18th International Conference on Very Large Data Bases (VLDB), 1992, pp. 27-40.

Goldsmith, et al., "Measuring Empirical Computational Complexity", Retrieved at <<http://theory.stanford.edu/~aiken/publications/papers/fse07.pdf>>, Proceedings of the the 6th joint meeting of the European software engineering conference and the ACM SIGSOFT symposium on the foundations of software engineering (ESEC/FSE), 2007, pp. 10.

Gulwani, et al., "SPEED: Precise and Efficient Static Estimation of Program Computational Complexity", Retrieved at <<http://citeseerx.ist.psu.edu/viewdoc/download?doi=10.1.1.159.3619&rep=rep1&type=pdf>>, Principles of Programming Languages (POPL), Jan. 18-24, 2009, pp. 16.

Isard, et al., "Dryad: Distributed Data-parallel Programs from Sequential Building Blocks", Retrieved at <<http://www-users.cselabs.umn.edu/classes/Spring-2010/csci8211/Readings/Microsoft-Dryad-eurosys07.pdf>>, Proceedings of the Eurosys Conference, Mar. 21-23, 2007, pp. 14.

Kwon, et al., "Skew-resistant Parallel Processing of Feature-extracting Scientific User-defined Functions", Retrieved at <<http://www.cs.washington.edu/homes/magda/papers/kwon-socc10.pdf>>, Proceedings of the 1st ACM symposium on Cloud computing (SoCC), Jun. 10-11, 2010, pp. 12.

Narayanan, et al., "Predictive Resource Management for Wearable Computing", Retrieved at <<http://citeseer.ist.psu.edu/viewdoc/download;jsessionid=A861FB833279D368A5C97585E6C927F1?doi=10.1.1.57.8133&rep=rep1&type=pdf>>, Proceedings of the 1st international conference on Mobile systems, applications and services (MobiSys), 2003, pp. 16.

Olston, et al., "Pig Latin: A Not-so-foreign Language for Data Processing", Retrieved at <<http://sca2002.cs.brown.edu/courses/csci2950-t/piglatin.pdf>>, Proceedings of the ACM SIGMOD international conference on Management of data, Jun. 9-12, 2008, pp. 12.

Pavlo, et al., "A Comparison of Approaches to Large-scale Data Analysis", <<http://datasearch.ruc.edu.cn/jsjgl/paper/A%20Comparison%20of%20Approaches%20to%20Large%20Scale%20Data%20Analysis%20.pdf>>, Proceedings of the 35th SIGMOD international conference on Management of data, Jun. 29-Jul. 2, 2009, pp. 165-178.

Yu, et al., "DryadLINQ: A System for General-purpose Distributed Data-Parallel Computing using a High-level Language", Retrieved at <<http://pdos.csail.mit.edu/6.824/papers/yu-dryadlinq.pdf>>, Eighth Symposium on Operating System Design and Implementation (OSDI), 2008, pp. 1-14.

Zhao, et al., "BotGraph: Large Scale Spamming Botnet Detection", Retrieved at <<http://www.cs.northwestern.edu/~yzh734/papers/BotGraph-NSDI09.pdf>>, Proceedings of the 6th USENIX symposium on Networked systems design and implementation (NSDI), Apr. 2009, pp. 14.

\* cited by examiner

OPTIMIZING DATA PARTITIONING FOR DATA-PARALLEL COMPUTING

BACKGROUND

Distributed computing is a form of computing—generally by operation of application programs or "code"—in which many calculations are carried out simultaneously, often on a large body of "data," on the premise that large problems can often be divided into smaller problems which can be solved concurrently ("in parallel") for efficiency. To accomplish this parallelism, distributed computing makes use of multiple autonomous computers (or processors) to solve computational problems by dividing the problem into many sub-problems that are then solved by one or more of the autonomous computers (or nodes) in a cluster of computers. To perform computations on very large problems or datasets, distributed computing clusters (comprising tens, hundreds, or even thousands of autonomous computers) may be utilized.

Modern distributed execution engines (such as MapReduce, Hadoop, and Dryad) and their corresponding high-level programming languages (Pig, HIVE, and DryadLINQ) have done much to simplify the development of large-scale, distributed data-intensive applications. In all of these systems, execution parallelism is controlled through data partitioning which in turn provides the means necessary to achieve high-level scalability of distributed execution across large computer clusters. Thus, efficient performance of data-parallel computing heavily depends on the effectiveness of data partitioning.

However, current data partitioning techniques are often simplistic and can lead to unintended performance degradations or job failures. Many of the known techniques—originally developed for database applications—are ill-suited for complex user-defined functions and data models common to data-parallel computing. When partitioning data to enable parallel computations on multiple computers, the initial challenge is determining which partition function to use and how many data partitions to generate, and the wrong choices—or even the best choices from among limited options—can result in highly skewed workloads leading to poor performance with some machines completing in minutes while others running for hours. Consequently, the efficiency of the entire distributed processing system is constrained by the least efficient partition from among all of the partitions created. As distributed execution systems become increasingly used for more complex applications—such as large-scale graphing applications to detect botnets or analyze large-scale scientific data—the lack of effective and efficient partitioning schemes for distributed execution engines have become a major performance liability.

SUMMARY

Various implementations disclosed herein are directed to systems and methods for automatically generating a data partitioning plan that—given a data-parallel program and a large input dataset, and without having to first run the program on the input dataset—substantially optimizes performance of the distributed execution system. Several such implementations explicitly measure and infer various properties of both data and computation to perform cost estimation and optimization. For certain such implementations, estimation may comprise inferring the cost of a candidate data partitioning plan, and optimization may comprise generating an optimal partitioning plan based on the estimated costs of computation and input/output (I/O).

Various such implementations may be directed to a system for optimizing data partitioning for a distributed execution engine comprising a plurality of modules including one or more of the following: a code/EPG analysis module for deriving properties of a data-parallel program code in each vertex in a corresponding execution plan graph (EPG) compiled from the data-parallel program code; a complexity module for at least deriving the computational (or I/O and networking) complexity of each vertex in the EPG; a data analysis module for generating compact data representations corresponding to an input data for processing by the data-parallel program code; a statistics and sampling module for determining the relationship between input data size versus computational and input-output (I/O) costs; a cost modeling and estimation module for estimating the runtime cost of each vertex in the EPG and the overall runtime cost represented by the EPG (e.g., for a job represented by the EPG); and/or a cost optimization module for determining an improved data partitioning plan.

While performance of a data-parallel program also depends on many other factors—including, for example, infrastructure configurations and job scheduling—the challenges of data partitioning have been largely unaddressed and the various implementations disclosed herein improve data partitioning and, in turn, the usability of distributed execution systems.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings.

DETAILED DESCRIPTION

Figure 1:
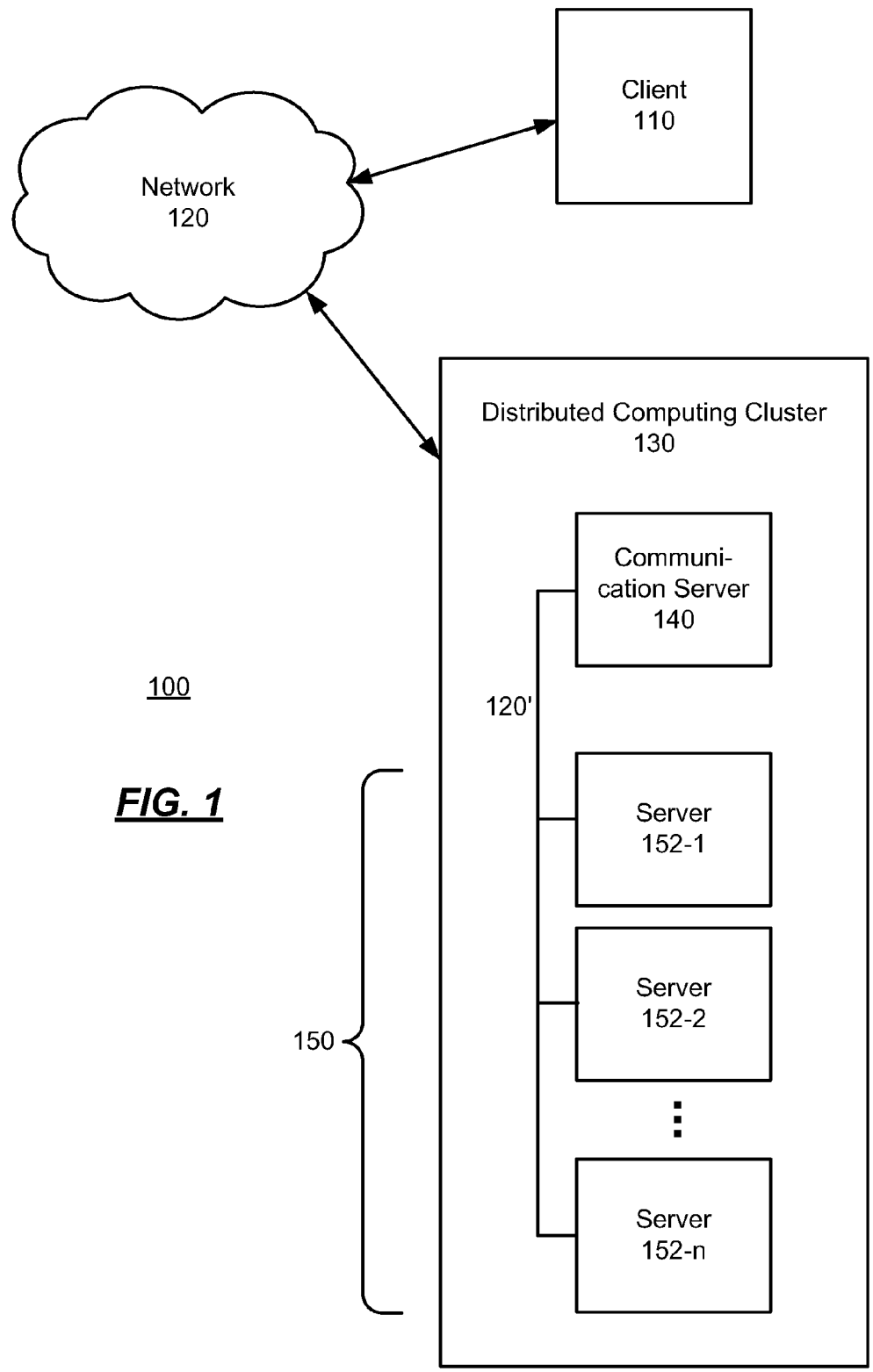
FIG. 1 is an illustration of an exemplary networked computer environment in which the numerous implementations disclosed herein may be utilized.

A distributed execution engine (sometimes referred to as a distributed memory multiprocessor or a distributed computer) is comprised of multiple processors connected by a network (and thus is highly scalable) to solve computational problems using parallel computing (where a problem is divided into many sub-problems, each of which is solved by different processor). For example, a massively parallel processor (MPP) is a single stand-alone computer with many networked processors using specialized high-speed interconnect networks where generally each processor has its own memory, copy of the operating system, and copy of the application(s). In contrast, a cluster (or cluster computer system) is a distributed execution engine comprising multiple computer systems (each a "cluster computer," "autonomous computer," or a "machine") connected by a network where each machine has its own processing elements, memory, operating system, and applications, and the network generally comprises commodity networking hardware. A grid computer system (or grid) is similar to a cluster but where the networked computers communicate over the Internet which, because of its relatively low bandwidth and high latency, are the most distributed form of parallel computing and typically deals only with "embarrassingly parallel" problems, that is, problems that are easily split into parallel tasks that require little or no communication between such tasks.

A distributed execution engine—whether an MPP, a cluster, or a grid—may comprise one or more multiprocessor computers and/or comprise one or more multicore processors. A multicore processor is a processor that includes multiple execution units ("cores") on the same chip, enabling it to process multiple instructions per cycle from multiple instruction streams. A multiprocessor computer, in comparison, is a stand-alone computer system (or "machine") with multiple processors that share memory and may connect via a bus, point-to-point links, or other high-speed means; however, "bus contention" (where more than one processor attempts to use the bus at the same time) and similar limitations often prevent such computing systems from scaling to more than thirty-two (32) processors. As such, a multiprocessor computer may comprise one or more multicore processors for multiplying computational power. In addition, there are also several specialized parallel/distributed computer systems based on reconfigurable computing systems with field-programmable gate arrays, general-purpose computing systems on graphics processing units, application-specific integrated circuits, and vector processors, to name a few, for example.

Notwithstanding the foregoing, the terms "concurrent," "parallel," and "distributed" strongly overlap, and are used interchangeably herein such that a same system may be characterized as "parallel" and/or "distributed" without loss of generality such that processors in a distributed system run concurrently in parallel. Where distinctions are necessary and the terms are disjunctively and in obvious conflict to a person of ordinary skill in the relevant art, then the term "parallel" as used in parallel computing shall refer to all processors having access to a shared memory that can be used to exchange information between processors, whereas the term "distributed" as used in distributed computing shall refer to each processor having its own private memory (a part of the "distributed memory") where information is exchanged by passing messages between the processors (presumably through an intermediary of some kind).

While various implementations disclosed herein are described in terms of a distributed computing system and, more specifically, in terms of a cluster computer system (or "distributed computing cluster"), skilled artisans will readily recognize that such implementations can readily be implemented on other types of distributed computing systems, and nothing is intended to limit the implementations disclosed herein to any specific distributed execution engine type nor to any specific configuration of processors such as multiprocessors but, instead, are intended to be given the widest interpretations possible.

FIG. 1 is an illustration of an exemplary networked computer environment 100 in which the numerous implementations disclosed herein may be utilized. The network environment 100 may include one or more clients, such as a client 110, configured to communicate with each other or with one or more servers, such as a communication server 140, through a network 120. The network 120 may be a variety of network types including the public switched telephone network (PSTN), a cellular telephone network, and a packet switched network (e.g., the Internet). While the client 110 and the server 140 are illustrated as being connected by the network 120, in some implementations it is contemplated that the client 110 and the server 140 may be directly connected to each other or even executed by the same computing system.

As shown in FIG. 1, and for several implementations disclosed herein, the communication server 140 may be part of a distributed computing cluster 130 comprising the communication server 140 and other computers (or processors) in a processing cluster 150 comprising a plurality of cluster machines (or simply "servers") 152-1, 152-2, . . . , 152-n (each also referred to interchangeably as a "machine", "cluster server", "cluster computer", or "autonomous computer") interconnected by a network 120'. The communication server 140 may be a separate machine from the machines in the processing cluster 150 (as shown) or the communication server 140 may also comprise a machine in the processing cluster 150. Moreover, the network 120' may be local network of some kind (e.g., a local area network or LAN) or it may be an extension of a larger network such as network 120.

Figure 5:
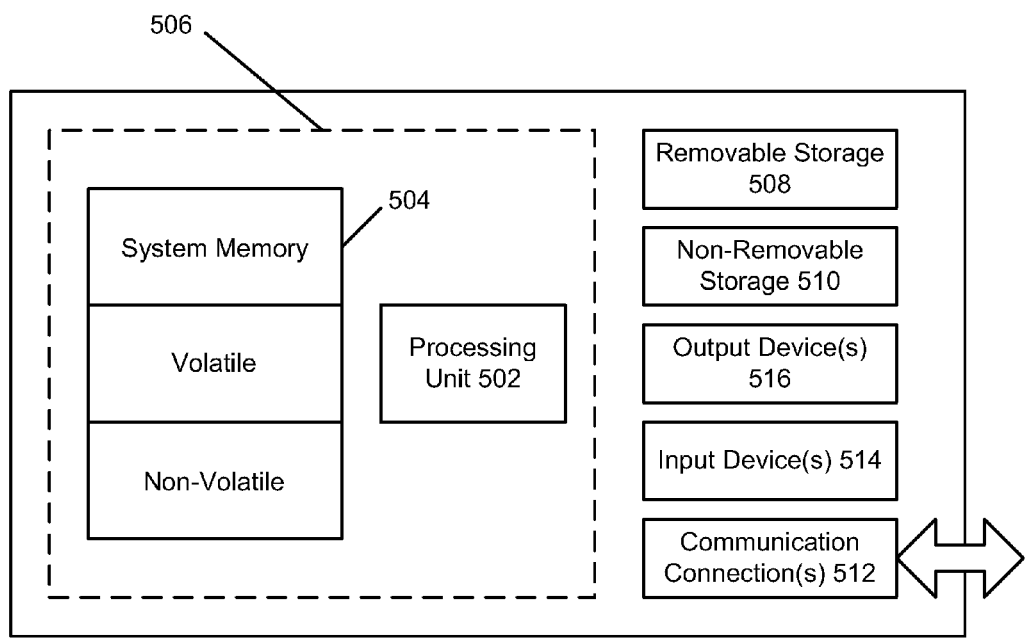
FIG. 5 shows an exemplary computing environment.

In some implementations, the client 110 may include a desktop personal computer, workstation, laptop, PDA, cell phone, smart phone, or any WAP-enabled device or any other computing device capable of interfacing directly or indirectly with the network 120, such as a computing device 500 illustrated in FIG. 5. The client 110 may run an HTTP client, e.g., a browsing program, such as MICROSOFT INTERNET EXPLORER or other browser, or a WAP-enabled browser in the case of a cell phone, PDA or other wireless device, or the like, allowing a user of the client 110 to access information available to it at the communication server 140 or to provide information to the communication server 140. Other applications may also be used by the client 110 to access or provide information to the communication server 140, for example. In some implementations, the server 140 may be implemented using one or more general purpose computing systems such as the computing device 500 illustrated in FIG. 5.

In current data-parallel computing systems, "hash" and "range" partitioning methods are widely used to partition datasets, but these methods remain highly vulnerable to workload skewing and inefficient partitioning. For example, partitioning data using either a partition function (e.g., a hash function) or a set of equally spaced range keys often yields unbalanced partitions in terms of data or computation, thereby resulting in poor performance (if not outright system failures). Moreover, in multiple stage computations, data skewing and/or computation skewing may not occur until later stages of the execution, making it difficult (if not impossible) to predict such skews before running the program.

While efforts have been made to reduce data-skews for database applications such as, for example, SQL queries, these solutions are not well-suited for certain distributed execution systems—for example, data-intensive parallel computing in a share-nothing computer cluster—because they generally presume highly structured data that is indexed and carefully stored so that strategic placement of a small execution instructions (such as an SQL query) at the desired data nodes is possible based on pre-computed data statistics. Consequently, these solutions do not support complicated data models or arbitrary user-defined functions which are common to distributed execution computing. Similarly, in determining the number of data partitions to use, often there is a tradeoff between the amount of computation per partition versus the amount of cross-node network traffic, and balancing these two competing factors can be challenging. And particularly challenging are dynamic datasets—that is, datasets that change frequently even from one execution to another—that necessarily require partitioning schemes that adapt to the changing data in order to achieve any kind of efficiency.

Indeed, finding optimal data partitioning for a data-parallel program is inherently challenging, and existing solutions used for parallel database systems are not directly applicable due to the differences in data and programming models. For example, traditionally database systems often use a set of predefined operators but provide little or no support for user-defined functions (UDF), while data-parallel computing often involves arbitrary user-defined functions which, in turn, make it difficult to ascertain how data is accessed, processed, and transformed to the next computation stage. Moreover, database systems typically operate on highly structured schema with built-in indices, whereas data-parallel programs compute on unstructured data where quickly computing data statistics (such as key distribution) without data indices is substantially more difficult. Database systems are also designed to query static datasets because of the overhead of storing data and building indices; in contrast, data-parallel computing often processes different and new datasets where frequent changes require adapting data partitioning schemes accordingly. In addition, to minimize writing intermediate data, parallel database systems often send optimized query plans to all nodes at the beginning of the query, whereas data-parallel computing often employ the use of physical disk storage to form communication channels for fault tolerance but which may not be efficiently accessed for analyzing for intermediate data.

Figure 2:
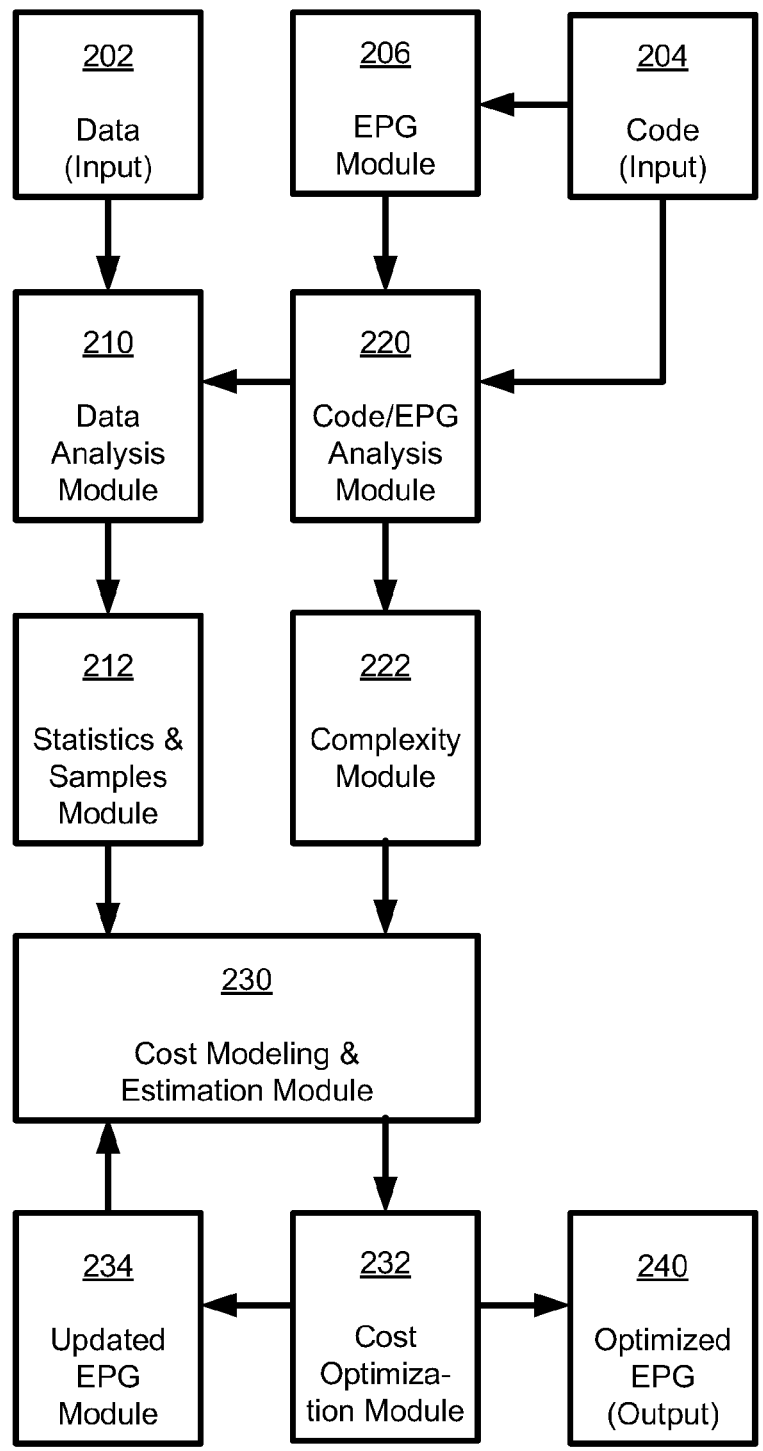
FIG. 2 is a block diagram illustrating the system architecture of an exemplary data partitioning optimizer for a distributed execution engine representative of several implementations disclosed herein.
Figure 3:
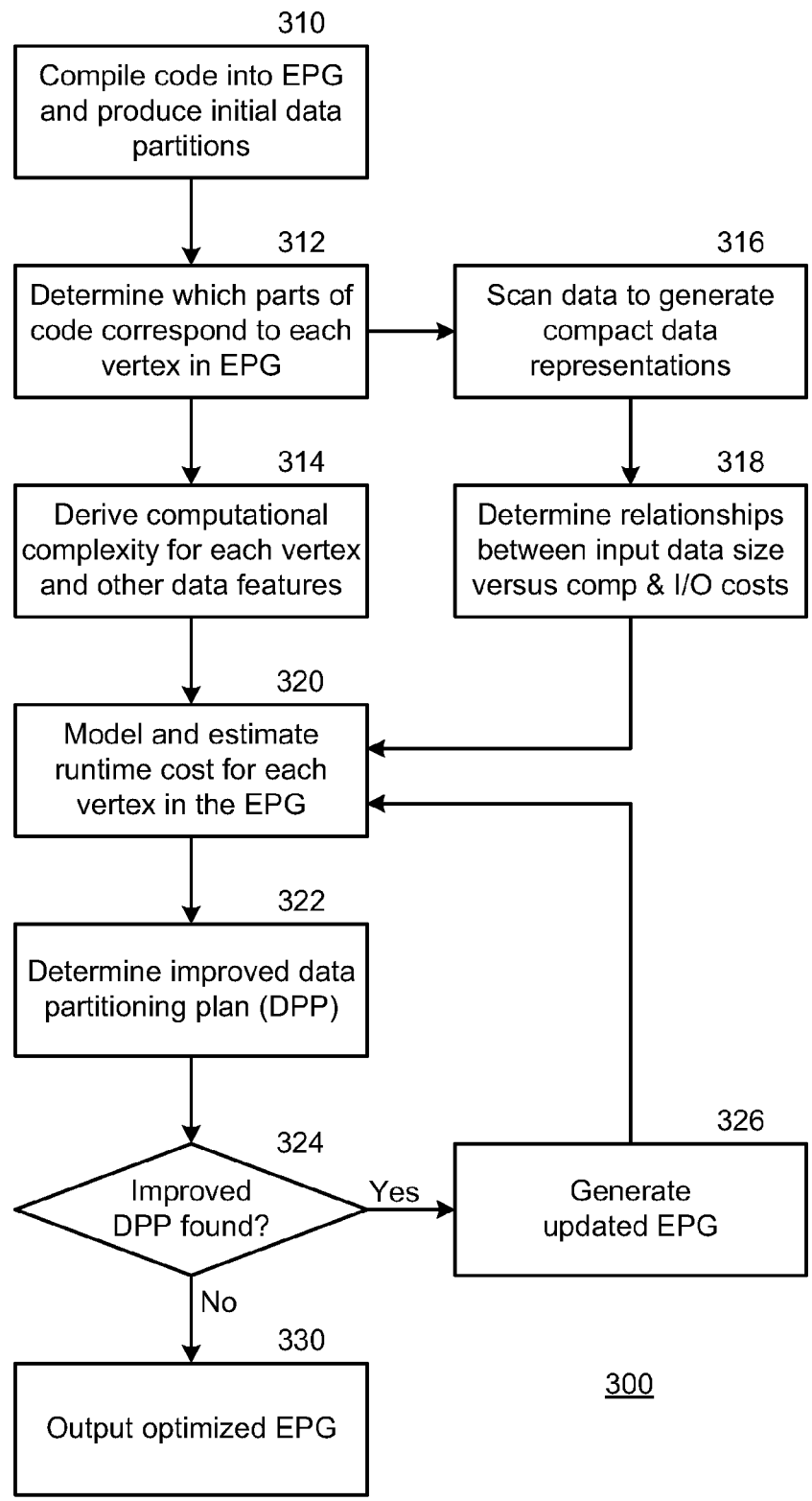
FIG. 3 is a process flow diagram illustrating the operation of the exemplary data partitioning optimizer for a distributed execution engine representative of several implementations disclosed herein.

To optimize data partitioning, various implementations are disclosed herein. FIG. 2 is a block diagram illustrating the system architecture of an exemplary data partitioning optimizer 200 for a distributed execution engine representative of several implementations disclosed herein. FIG. 3 is a process flow diagram illustrating the operation 300 of an exemplary data partitioning optimizer for a distributed execution engine representative of several implementations disclosed herein.

With reference to both FIG. 2 and FIG. 3, at 310 the EPG module 206 compiles an inputted data-parallel program code (or simply "code") 204 into a job execution plan graph (EPG) and produces the initial data partitions. A data-parallel program expressed by a higher-level programming language may be compiled into an execution plan graph, that is, a directed acyclic graph with multiple stages. For each stage, at least one vertex is created to process each input partition, and thus multiple vertices can run in parallel to process multiple input partitions. Moreover, in certain such implementations the aforementioned initial data partitions may be produced by the EPG module 206 using a partition function (e.g., a hash function), or may be supplied by a user, or may be derived from some other source.

At 312, the code/EPG analysis module 220—which receives as input both the EPG generated by the EPG module 206 and the code 204—derives various properties of the vertex codes. For certain implementations, the code/EPG analysis module 220 may leverage automatic static and dynamic programming language analysis techniques to understand both the data model and the semantics of a program in terms of its processing flow, computational complexity, and relevant data features. In some such implementations, users might manually specify attributes of user-defined functions (UDFs) to provide hints for programming language analysis. Select implementations may even predefine a set of callback APIs that users can implement with domain knowledge to explicitly specify data attributes (e.g., image features) or to define the way to measure computational complexity based on input. At 314, this code/EPG information is then used by the complexity module 222 to derive the computational complexity of each vertex program and other data features.

Concurrently, at 316, the data analysis module 210 linearly scans the data 202 to generate compact data representations. These compact data representations may comprise a representative sample set for input data; data summarizations including the number of input records, data size, etc; an approximate histogram of frequent data records; and/or the approximate number of distinct keys. The first two items (samples and summarizations) provide general statistics that are useful for several operations. The third item (histogram) is used for estimating skews. The fourth item (keys) is useful for estimating the output size for certain distributed execution jobs.

The code/EPG information from 312 is used to help the data analysis module 210 determine how to strategically sample the input data 202 and estimate relevant data statistics. For example, in instances where it may be desirable to understand which image features (such as texture richness, resolution, etc.) determine the computational cost, the code/EPG analysis module 220 may prompt the data analysis module 210 to identify image records in the data 202 that are expensive to process and then distribute them evenly among the data partitions. Thus, by extracting program-specific data features and using them as a guide to the data analysis process, the system is able to generate compact data representations. Based on the results of this data analysis, at 318 the statistics and samples module 212 determines the relationship between input data (such as size) versus execution costs (such as computational and I/O costs).

At 320, the complexity information from the complexity module 222 and the relationship information from the statistics and samples module 212 are together used by the cost modeling and estimation module 230 to model and estimate the runtime cost of each vertex in the EPG and the overall runtime cost for the job represented by the EPG. These modeled estimates may consider many factors including but not limited to CPU time, output data size, and network traffic. For certain implementations, these estimates may specifically include analytically estimating the costs using code analysis results. For certain other implementations, the estimates may specifically include empirically estimating the costs by running a job on the sample data and then performing regression analysis on the measured job performance for each vertex. (As used herein, "performance" broadly refers to a wide range of metrics including but not limited to the number of processes required, CPU time, job latency, memory utilization, disk I/O, and network I/O, among other measures.) For yet other implementations, these two approaches may be combined to improve the estimation accuracy. Once the cost of each vertex in an EPG is estimated, the critical path can be identified (using techniques such as dynamic programming) in order to estimate the cost of the entire job.

At 322, the cost estimate produced by the cost modeling and estimation module 230 is used by the cost optimization module 232 to determine an improved data partitioning plan and, if one is found at 324, then at 326 the updated EPG module 234 generates an updated EPG and loops back to 320 for further analysis (e.g., finding a critical path in the updated EPG) by the cost modeling and estimation module 230 for another around of optimization. This process continues iteratively until the results converge, that is, until at 324 no improved data partitioning plan can be found by the cost optimization module 232. At that point, at 330, the resultant EPG that is output of the cost optimization module 232 is in turn output as the final optimized EPG 240 for execution.

For several implementations, the optimization process 300 may be applied to stages offline before computation on the entire data set begins. For other implementations, the optimization process may operate concurrent with the computation to dynamically partition data such as in an online or dynamic data context. For certain implementations, optimization may be introduced as a new stage in existing programming models. In yet other implementations, the data analysis process may be piggybacked when the system writes immediate data to disks so that it adds little overhead to the overall computation.

For various implementations, a flexible and expressive partitioner may be used for the iterative cost estimation and optimization process. Such a partitioner may derive an optimal partitioning scheme stage by stage for the EPG using a hierarchical partitioning graph (HPG)—where large partitions are recursively split and small partitions are merged—so that the final partitions are relatively balanced in per-partition estimated cost. By balancing the cost at each stage, the methodology effectively minimizes the total cost along the critical path of the EPG to effectively reduce the overall cost of the job.

Figure 4:
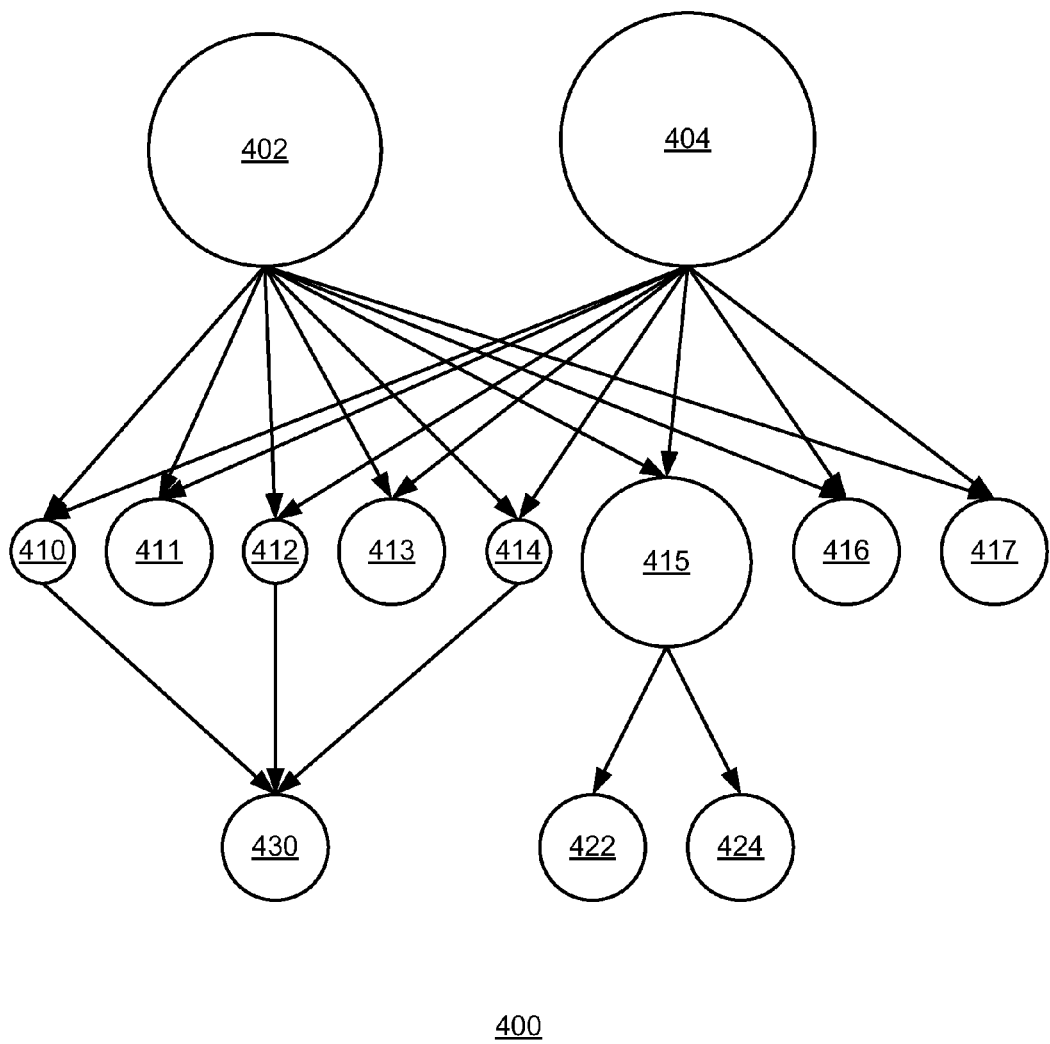
FIG. 4 illustrates exemplary operation of a partitioning graph that may be utilized by several implementations disclosed herein.

FIG. 4 illustrates exemplary operation of a partitioning graph 400 that may be utilized by several implementations disclosed herein. To achieve an optimized solution, the cost optimization module 232 of FIG. 2 inserts an additional partition stage into the current EPG to greedily search for an optimized partitioning scheme. In FIG. 4, two root nodes 402 and 404 represent two partitions of the sampled input data. In certain implementations, these two root nodes 402 and 404 may first be deconstructed and recombined into a larger number of smaller partitions 410-417 using an existing partitioner (such as, for example, a hash partitioner). The EPG is then updated accordingly by the updated EPG module 234. The cost modeling and estimation module 230 then identifies the critical path up to the current stage in the updated EPG, which in this example as illustrated in FIG. 4 includes the vertex associated with partition 415. To reduce cost, the partition 415 is split into two partitions 422 and 424 by another partitioner (which again may be a hash partitioner). Meanwhile, partitions 410, 412, and 414 of this example, all having small execution costs, may be identified as such and then merged into partition 430 in order to reduce I/O, the overhead of launching vertices, and the potential overall cost.

For several such implementations, this process of cost estimation and optimization by recursive data merging and splitting may be iterated until the results converge. As such, each iteration is a greedy step towards minimizing the overall cost. The EPG is updated throughout the process until the last update for the final partitioning scheme, and the optimization process may then continue for the next stage in the EPG. Once the partitioning scheme is derived, a data record from the input can be directly assigned to the appropriate data partition without intermediate data splitting or merging.

FIG. 5 shows an exemplary computing environment in which example implementations and aspects may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for optimizing data partitioning for a distributed execution engine, the system comprising:
    a memory; and
    a processing unit coupled to the memory that is configured to operate:
        a code/EPG analysis module for deriving properties of a data-parallel program code in each vertex in a corresponding execution plan graph (EPG) compiled from the data-parallel program code using at least one attribute of a user-defined function provided by a user and a predefined set of callback application program interfaces (APIs) that enables the user to specify data attributes for partitioning the data-parallel program code and define measuring computational complexity for partitioning the data-parallel program code based on input;
        a complexity module for at least deriving the computational complexity of each vertex in the EPG;
        a data analysis module that concurrently and cooperatively functions with the code/EPG analysis module for generating a plurality of compact data representations corresponding to an input data for processing by the data-parallel program code, wherein the data analysis module, in conjunction with the code/EPG analysis module, samples the input data and estimates data statistics;
        a statistics and samples module for determining the relationship between the input data and the computational and input-output (I/O) costs based at least in part on the estimated data statistics;
        a cost modeling and estimation module for estimating the runtime cost of each vertex in the EPG and the overall runtime cost represented by the EPG; and
        a cost optimization module for determining a data partitioning plan.

2. The system of claim 1, wherein the code/EPG analysis module uses automatic static and dynamic programming language analysis techniques.

3. The system of claim 2, wherein the automatic static and dynamic programming language analysis techniques derive at least one semantic from among the following plurality of semantics: processing flow, computational complexity, and relevant data features.

4. The system of claim 2, wherein the code/EPG analysis module uses hints for programming language analysis provided for user-defined functions.

5. The system of claim 1, further comprising an EPG module for compiling the data-parallel program code into the EPG, wherein the EPG comprises a plurality of vertices, and wherein each partition from among a plurality of initial data partitions is processed by at least one vertex from among the plurality of vertices.

6. The system of claim 5, wherein the EPG module produces the plurality of initial data partitions from the input data.

7. The system of claim 6, wherein the initial data partitions are produced by the EPG module using a partition function.

8. The system of claim 1, further comprising an updated EPG module for generating an updated EPG when the data partitioning plan is determined by the cost optimization module.

9. The system of claim 1, wherein the EPG is a directed acyclic graph having multiple stages wherein each stage comprises at least one vertex to process each input data partition from among a plurality of initial data partitions.

10. The system of claim 9, wherein at least two vertices run in parallel to process at least two initial data partitions.

11. The system of claim 1, wherein the at least one attribute of a user-defined function provided by the user provide hints for analysis of the data-parallel program code.

12. A method for optimizing data partitioning for a distributed execution engine, the method comprising:
    determining a plurality of parts of a data-parallel program code corresponding to each vertex in a corresponding execution plan graph (EPG) using at least one attribute of a user-defined function provided by a user and a predefined set of callback application program interfaces (APIs) that enables the user to specify data attributes for partitioning the data-parallel program code and define measuring computational complexity for partitioning the data-parallel program code based on input, the EPG comprising a plurality of vertices corresponding to a plurality of initial data partitions;
    deriving a computational complexity for each vertex from among the plurality of vertices in the EPG;
    sampling input data using the EPG for estimating data statistics;
    determining a plurality of relationships between the input data and a plurality of execution costs based at least in part on the estimated data statistics;
    estimating a runtime cost for each vertex from among the plurality of vertices in the EPG; and
    estimating the overall runtime cost represented by the EPG.

13. The method of claim 12, wherein determining the relationships between the input data and the execution costs is further based on the plurality of parts of the data-parallel program code that correspond to each vertex in the corresponding EPG.

14. The method of claim 12, further comprising compiling a data-parallel program code into the EPG.

15. The method of claim 12, further comprising attempting to determine an improved data partitioning plan and:
   if the improved data partitioning plan is determined, updating the EPG and iteratively repeating the estimating and determining until another improved data partitioning plan cannot be determined; and
   if the improved data partitioning plan cannot be determined, outputting the resultant EPG.

16. The method of claim 15, further comprising producing the plurality of initial data partitions from the input data for processing by a data-parallel program code.

17. The method of claim 15, wherein determining the improved data partitioning plan comprises using a hierarchical partitioning graph.

18. A computer-readable storage medium that is not a signal, the computer-readable storage medium comprising computer-readable instructions for optimizing data partitioning for a distributed execution engine, the computer-readable instructions comprising instructions that cause a processor to:
   analyze a data-parallel program code and its corresponding execution plan graph (EPG) using at least one attribute of a user-defined function provided by a user and a predefined set of callback application program interfaces (APIs) that enables the user to specify data attributes for partitioning the data-parallel program code and define measuring computational complexity for partitioning the data-parallel program code based on input;
   concurrently analyze input data and a plurality of corresponding initial data partitions by using the results of analyzing the data-parallel program code and the EPG;
   estimate a runtime cost for each vertex from among a plurality of vertices comprising the EPG;
   determine an improved data partitioning plan and update the EPG accordingly; and
   repeat the estimate and the determine until an optimized EPG is found.

19. The computer-readable medium of claim 18, further comprising instructions for causing the processor to:
   deconstruct and recombine at least two data partitions into at least three or more smaller data partitions;
   update the EPG;
   identify a critical path in the updated EPG; and
   split at least one vertex corresponding to the path in the updated EPG.

20. The computer-readable medium of claim 18, further comprising instructions for causing the processor to:
   deconstruct and recombine at least two data partitions into at least three or more smaller data partitions;
   update the EPG;
   identify two or more smaller data partitions having smaller execution costs; and
   merge the two or more smaller data partitions into a combined data partition.

* * * * *